Aug. 26, 1941.  N. J. POUX  2,253,810
INJECTION MACHINE
Filed Aug. 4, 1938   3 Sheets-Sheet 2

INVENTOR.
Noel J. Poux
BY Kelley & Chisholm
ATTORNEYS.

Aug. 26, 1941.         N. J. POUX                2,253,810
                    INJECTION MACHINE
                   Filed Aug. 4, 1938            3 Sheets-Sheet 3

INVENTOR.
Noel J. Poux
BY Kelley Chisholm
ATTORNEYS.

Patented Aug. 26, 1941

2,253,810

UNITED STATES PATENT OFFICE 2,253,810

INJECTION MACHINE

Noel J. Poux, Meadville, Pa., assignor to Talon, Inc., a corporation of Pennsylvania Application August 4, 1938, Serial No. 223,097

4 Claims. (Cl. 18—30)

My invention relates to an injection machine which is particularly intended for injection molding of plastic materials. Although the immediate object of my invention is to provide a machine which will afford a constant and ample supply of moldable material to an automatic molding machine for manufacturing in repeated succession a series of articles, it is believed that it is also adaptable to a wide variety of uses such as the manufacture of large parts or relatively long pieces.

According to one embodiment of my invention a plurality of injection cylinders are provided with means for establishing communication in turn with a common injection nozzle so that during the back stroke of one piston and charging and heating of the material therein, there will be a continuous flow of material from another cylinder. It is an object of my invention in an arrangement of the kind described, to provide a compact and cheap construction. A further object is to provide means for operating the piston in such a manner that the material will be supplied in a substantially continuous manner in spite of the time required for heating and compression of the material in the cylinders. The third object is to provide a simple and automatic device which establishes communication between the injection nozzle and the cylinders in turn and at the same time, provides for an interval toward the end of the stroke of each piston when the injection nozzle is simultaneously in communication with the next succeeding cylinders as well as the one which is just about to finish its stroke in order that there may be no interruption in the flow of material.

Among other objects of my invention may be mentioned the following:

a. To produce an injection machine which will provide for continuous injection of material with equal pressure at all times;

b. To speed up the heating process by preheating material in an agitating hopper thus increasing the capacity of the machine; and c. To inject from each of the cylinders its entire contents leaving the cylinder clean to receive fresh material thus not overheating and driving off the plasticizer.

In the accompanying drawings, I have shown for purposes of illustration one embodiment which my invention may assume in practice. In the drawings.

Figure 1:
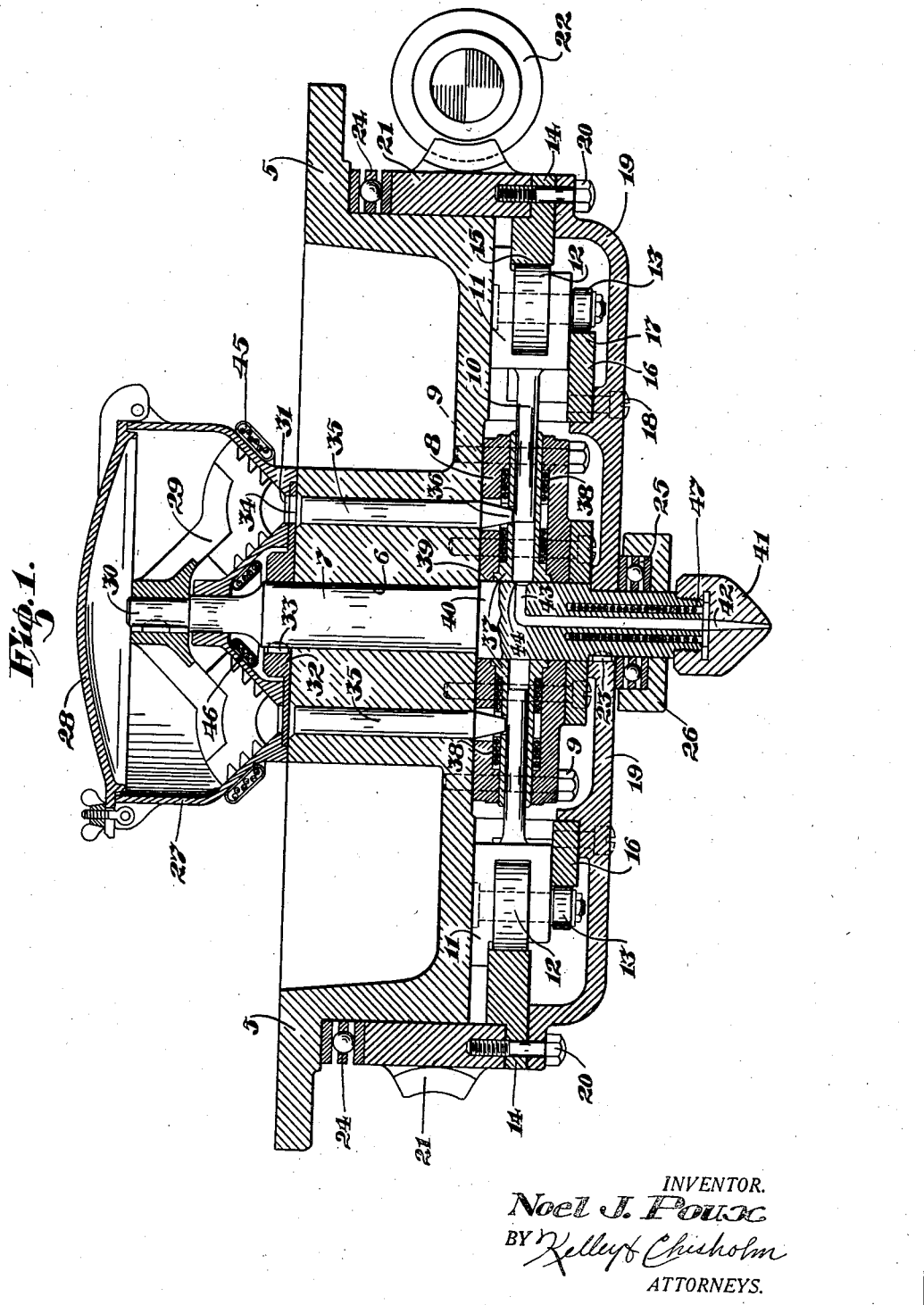
Fig. 1 is a vertical central cross-section through my improved machine.
Figure 2:
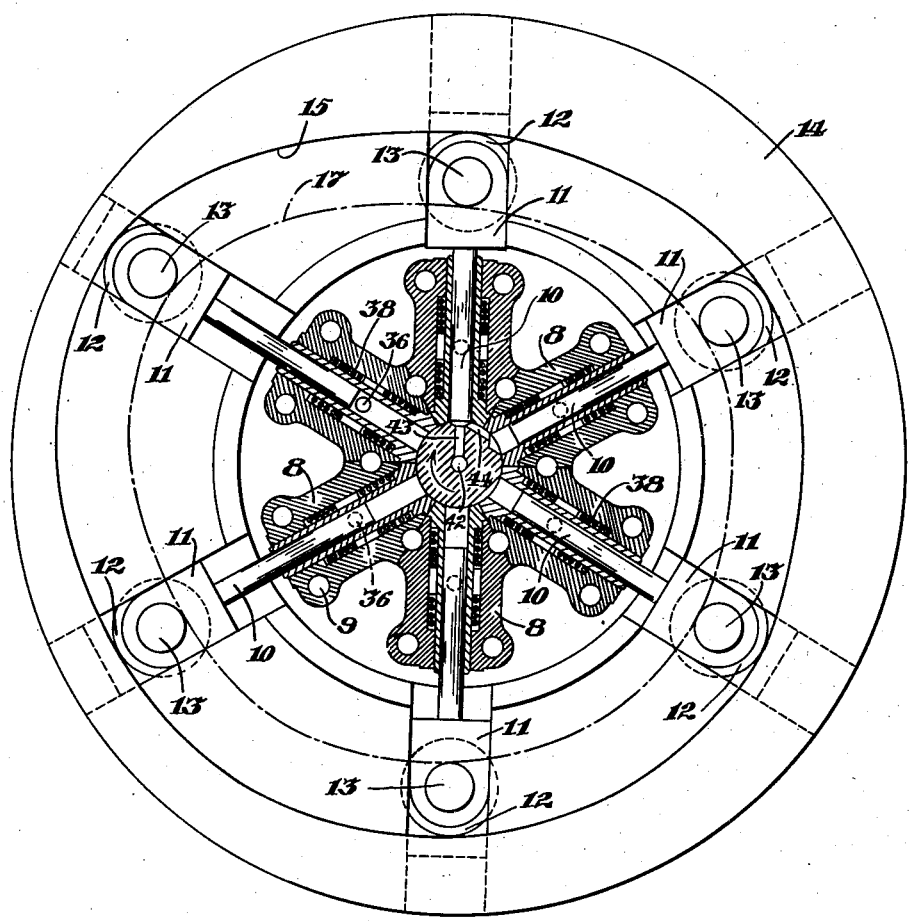
Fig. 2 is a horizontal cross-section through the machine in line with the cylinders.
Figure 3:
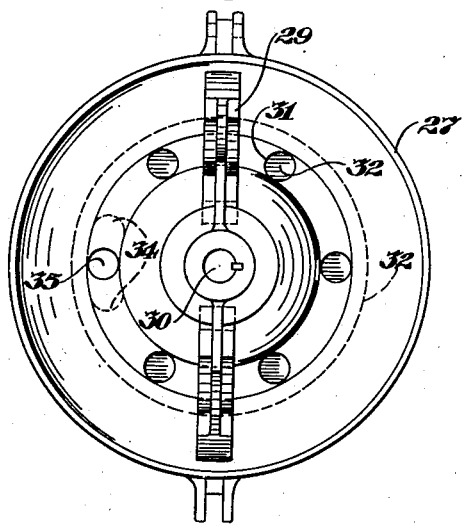
Fig. 3 is a top plan view of the hopper with lid removed.

In the design of the machine illustrated, 5 indicates the stationary frame element having a central member 6 through which passes the vertical shaft 7. A series of radially arranged cylinders 8 in horizontal plane are attached to the under side of the frame 5, by suitable bolts 9. There must be a sufficient number of these cylinders to provide a continuous flow of material and due to the fact that the greater part of the time cycle of any one cylinder is taken up by the return stroke, charging, heating and compressing the charge, I believe it is advisable to have about six cylinders. In each of these cylinders there is a piston 10 which is connected to a cross-head 11 carrying a large roller 12 and a small roller 13. A large circular plate cam 14 extends completely around all of the cylinders. This cam surface 15 is in contact with the large rollers 12. A second complementary plate cam 16 of smaller diameter than the cam 14 is arranged inside the series of rollers 13 and has outer cam surfaces 17 having a design complemental to the design of surface 15 which bears against the rollers 13. The cam 16 is connected by bolts 18 to a rotating frame 19 which is secured by bolts 20 passing through the plate cam 14 to the gear 21. This worm gear is slowly rotated by a worm 22 which is driven from any suitable source of power. This rotating frame is keyed as indicated at 23 to the shaft 7 so that the shaft 7 is driven at the same speed as the plate cams 14 and 16. A roller bearing 24 may be provided between the worm gear 21 and the frame 5 to offset the thrust of the worm gear 22. A second roller bearing 25 transmits the weight of the moving parts to the member 26 which may be a part of the frame 5.

On the upper end of the frame and around its central portion there is provided a container 27 for the molding material which may be kept covered by a suitable cover 28. An ejector 29 is attached to the upper end 30 of the shaft 7 for constantly ejecting the material and assisting it to flow to the openings 31 at the bottom of the hopper. A measuring plate 32 is keyed to the shaft 7 at 33 and has a slot 34 adapted to register with the holes 31 and also the passageways 35 immediately below the holes 31 and leading to the cylinders 8. The length of the slot 34 will determine the quantity of material which is allowed to pass from the container 27 into the passageways 35. There is thus a measured charge of material dropping into each of the cylinders at each stroke. This material passes through the passageways 35 and the port 36 into the cylinder when the piston 10 is at the extreme outer limit of its movement. In the inner lining of each of the cylinders 8 there is a sleeve 37 and between the sleeve and the outer wall of the cylinder there are arranged suitable heating elements 38. The ends of the cylinders open directly through ports to the inner bore 39 in the stationary frame in which rotates the larger diameter portion 40, of the shaft 7. The shaft 7 carries on its lower end an injection nozzle 41 and has passageway 42 leading from the nozzle through the shafts to a point in line with the cylinders and thence radially at 43. This radial branch communicates with a peripheral groove 44 which is wide enough to reach the outward ports of two adjacent cylinders and leave them in communication with each other for certain interval of the stroke in order to allow for continuous flow of material.

The pre-heating of the material in the agitating hopper may be accomplished by locating suitable heating elements 45 around the exterior walls of the hopper and heating elements 46 are located in the central wall around the shaft 30. A further accurate control on the injection material as it flows to the injection nozzle, is obtained by placing a heating element 47 around the injection nozzle.

Figure 4:
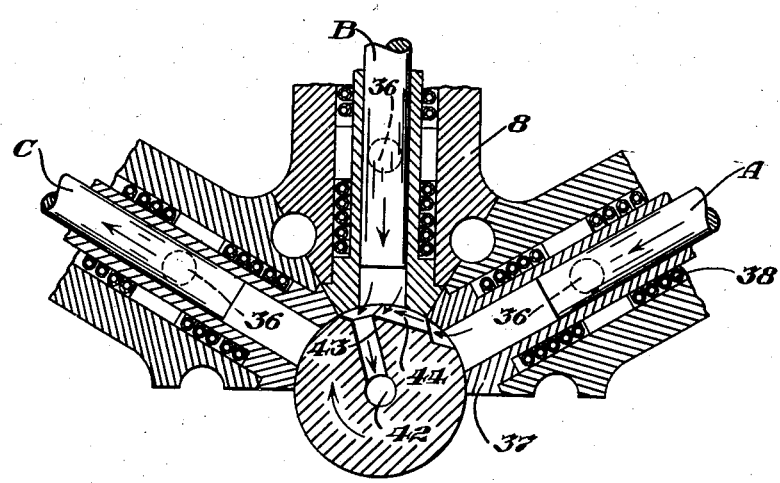
Fig. 4 is a detail view on an enlarged scale showing a portion of the mechanism seen in Fig. 2.

Now assuming that one of the cylinders has been charged and the machine is in motion, the surface 15 of the outer plate cam will push the piston inwardly compressing the charge and the design of the cam is such as to allow sufficient amount of time for adequate heating of the material and compression of the same during heating. When it is fully heated and the piston has moved to some such position as indicated at A in Fig. 4, the groove 44 will open communication with the injection nozzle and the material will be forced through the same. At this time, it will be observed that the piston B is still descending and forcing the material to the injection nozzle so that an interval is allowed to establish a normal flow from the cylinder A. Cylinder C has just been cut off and is on the return stroke. The design of the cam is such as to allow a rather rapid return of the piston.

While I have shown and described in this application one embodiment which my invention may assume in practice, it will be understood that this embodiment is merely for the purposes of illustration and that various other forms may be devised within the scope of my invention as set forth in the appended claims.

What I claim as my invention is:

1. An injection machine comprising a plurality of cylinders, separate supply means for supplying moldable material to each cylinder, a single movable injection member, means for moving said injection member to establish communication with said cylinders in turn, means for measuring the charge to each cylinder and means for operating said measuring means in timed relation with the movement of said injection member.

2. An injection machine comprising a plurality of cylinders for moldable material, means for supplying granular moldable material thereto, means for heating the charge of material in said cylinder, means for ejecting the same therefrom after heating, common discharge means for all of said cylinders, means for establishing communication between said discharge means and said cylinders in turn, and means for heating the material as it passes through said discharge member.

3. An injection machine comprising a plurality of cylinders each adapted to contain moldable material, means for heating said cylinders and a reciprocable piston for compressing a charge of material in each of said cylinders, a hopper for moldable material, separate passageways leading from said hopper to each of said cylinders, and rotary valve means for intermittently opening said passageways in turn for predetermined intervals at a time to control the supply of material from said hopper to said cylinders.

4. An injection machine comprising a plurality of injection cylinders each having a piston reciprocable therein, means for charging the cylinders with granular moldable material, a common injection nozzle for said cylinders, said cylinders and nozzle being relatively movable, means for pre-heating the granular material while in granular condition before the cylinders are charged with the same, means for heating the material in each cylinder to plastic condition, and means for establishing communication between said nozzle and said cylinders in turn upon such relative movement.

NOEL J. POUX.